Feb. 16, 1943. H. D. GREEN 2,311,381
DEVICE FOR DAMPING PRESSURE
Filed Feb. 24, 1941

INVENTOR.
HOWARD D. GREEN
BY Robert M. McManigal
ATTORNEY.

Patented Feb. 16, 1943

2,311,381

UNITED STATES PATENT OFFICE 2,311,381

DEVICE FOR DAMPING PRESSURE

Howard D. Green, Compton, Calif., assignor to MacClatchie Manufacturing Company of California, Compton, Calif., a corporation of California Application February 24, 1941, Serial No. 380,279

4 Claims. (Cl. 138—46)

This invention relates to a device for limiting or damping pressure fluctuations and is adapted to be used with pressure gauges or other instruments which are liable to injury if subjected to rapid or violent changes in pressure.

The object of my invention is to provide a device for limiting or damping pressure fluctuations which device may be readily adjusted as desired and which is easy and economical to construct.

Another object of my invention is to provide a device for damping pressure comprising a housing having a bore communicating with inlet and outlet openings and having a tapered seat, a tapered member in the tapered bore forming a fluid passageway between the tapered member and the tapered seat, and means to adjust the position of the tapered member in the tapered bore in order to adjust the area of the fluid passageway as desired. Another object of my invention is to provide a device for damping pressure which allows the gauge to quickly indicate a reduced pressure, even though the device is adjusted to greatly dampen pressure.

Another object of my invention is to provide a device for damping pressure in which a tapered member is resiliently urged towards a tapered seat so that the tapered member is adapted to be moved away from the tapered seat independently of the adjusting means when the pressure in the outlet opening is substantially greater than the pressure in the inlet opening so that the area of the fluid passageway therebetween is increased in order to allow the gauge to quickly indicate the reduced pressure, even though the device is adjusted to greatly dampen pressure fluctuations.

Another object of my invention is to provide means to indicate the position of the tapered member with respect to the tapered seat so that the device may be properly adjusted for any given pressure.

The device is adapted to be interposed in the pressure communicating duct leading from a source of pressure to a gauge or other pressure measuring or recording instrument in order to limit or dampen the pressure fluctuations, while communicating an average of pressure steadily to the gauge or other instrument.

My invention has many other objects, advantages, and features, some of which, with the foregoing, will be set forth at length in the following description where I shall outline one form of my invention, which I have selected for illustration in the drawing accompanying and forming a part of the present specification.

Figure 1:
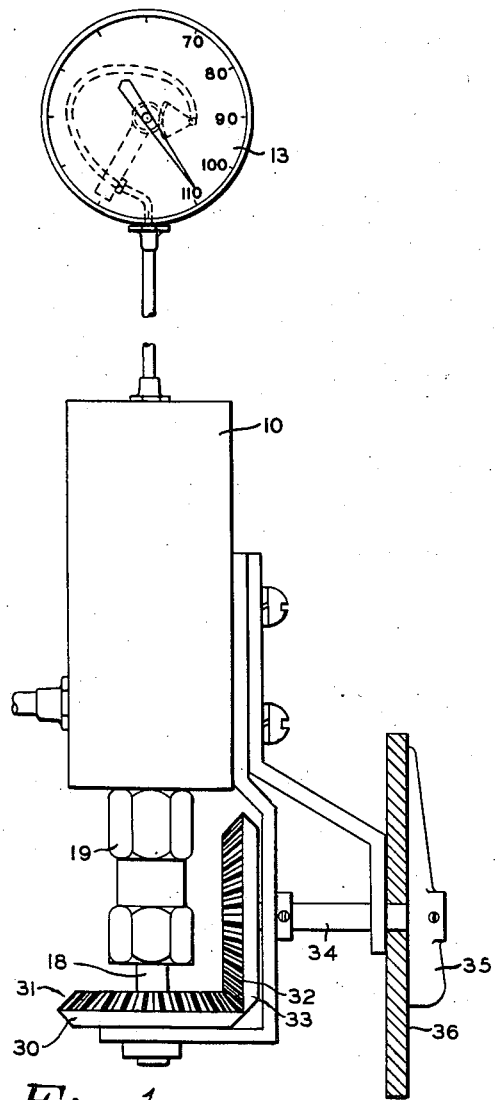
Figure 1 is a side elevation of an embodiment of my invention.
Figure 3:
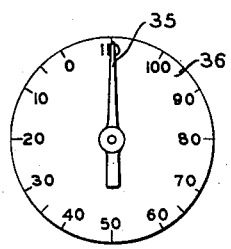
Figure 3 is a view taken on the line 3—3 of Figure 1.
Figure 2:
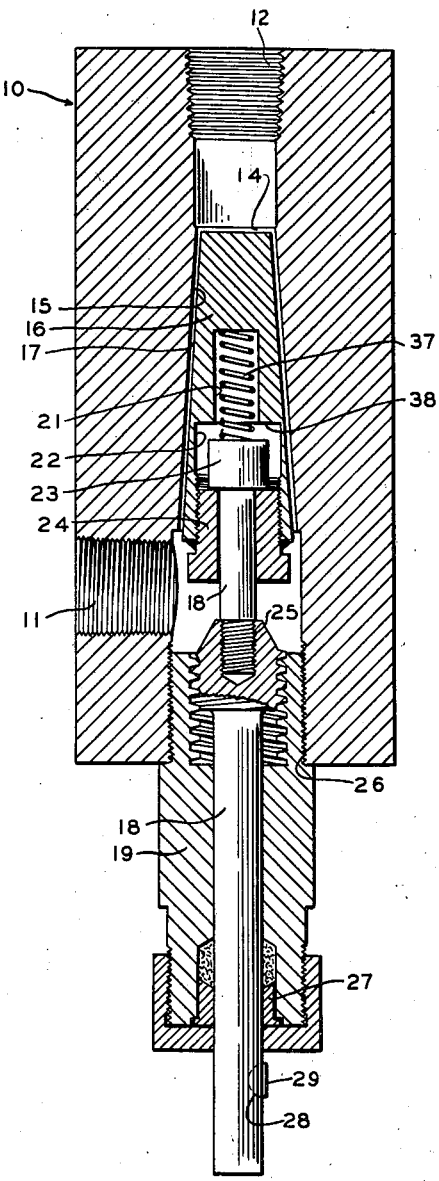
Figure 2 is an enlarged sectional view of the pressure damping device of my invention.

Referring to the drawing the numeral 10 indicates a housing provided with an inlet opening 11 and an outlet opening 12. The inlet opening is adapted to be connected to a source of pressure, for example, fluid from a diaphragm unit and the outlet opening is adapted to be connected to a gauge 13 or other pressure measuring or recording instrument. The housing is also provided with a bore 14 which communicates with both the inlet opening 11 and the outlet opening 12 and has a tapered seat 15. A tapered member 16 is adapted to be positioned in the bore 14 adjacent the tapered seat 15 in order to provide a fluid passageway 17 therebetween.

Means are provided to move the tapered member 16 toward and away from the tapered seat 15 in order to adjust the area of the passageway 17 formed therebetween. As an instance of this arrangement the tapered member 16 is provided with an operating shaft 18. The operating shaft 18 extends longitudinally of the housing 10 and is provided with a shaft housing 19. The tapered member 16 is provided with a longitudinal bore 21 and a counterbore 22, the outer end of which is threaded. The inner end of the operating shaft 18 is provided with an enlarged portion 23 which is held in the longitudinal counterbore 22 by means of a retaining nut 24. The operating shaft 18 is made in two parts, which are threaded together as indicated at 25. The shaft housing 19 is threaded in the housing 10 as indicated at 26 and is provided with a packing gland 27.

The shaft 18 is provided with a key way 28 in which a woodruff key 29 is inserted. The outer end of the woodruff key is inserted in a slot (not shown) of a beveled gear 30.

The teeth 31 of beveled gear 30 mesh with the teeth 32 of a beveled gear 33, which gear is adapted to be rotated by means of a stem 34 and a handle 35 which is also an indicating means. A gauge 36 is provided to indicate the adjustment of the tapered member 16 with respect to the tapered seat 15. As the stem 34 is rotated in one direction the tapered member 16 is moved toward the tapered seat 15, thereby decreasing the area of the passageway 17 and as the stem 34 is rotated in the opposite direction, the tapered element is moved away from the tapered bore, thereby increasing the area of the passageway 17.

Means are provided to urge the tapered member 16 toward the tapered seat 15, but to allow the tapered member 16 to be moved away from the tapered seat when the pressure in the outlet opening 12 is substantially greater than the pressure in the inlet opening 11 in order to increase the area of the fluid passageway 17. As an instance of this arrangement, a spring 37 is positioned in the longitudinal bore 21, and it will be readily seen that when the pressure is released on the inlet side of the device that the pressure in the gauge 13 will force the tapered member 16 to be moved away from the tapered seat 15, compressing the spring 37, until the inner end 38 of the counterbore 22 engages the enlarged portion 23 of the operating shaft 18, thereby increasing the area of the fluid passageway 17.

As the pressure in the inlet opening 11 becomes substantially the same as the pressure in the outlet opening 12, the spring 37 again forces the tapered member 16 toward the tapered seat 15, thereby again reducing the area of the fluid passageway 17.

I have found it preferable to vary the amount of clearance between the inner end 38 of the counterbore 22 and the enlarged portion 23 of the shaft 18 depending upon the use of the device. For example, I prefer to provide a much larger clearance between said members when the device is to be used in connection with a so-called "vernier" gauge than with a regular gauge.

Once the proper adjustment is made between said parts, I prefer to fix the position of the retaining nut 24 with respect to said opening 22 in order to maintain said adjustment at all times.

In using the device in present well drilling operations, it will be readily understood that different degrees of damping will be desired. For example, in using the device in connection with a weight indicator, a different adjustment will be desired in the device when only a comparatively few tons are suspended in the well bore, than when many tons are suspended from the derrick. These adjustments can be properly made by means of rotating the handle 35. The scale 36 is provided so that the damping secured by any position of the handle can be secured at will. It will also readily be seen that as the pressure on the inlet side is reduced, that the correct reading of the pressure will be quickly indicated on the gauge 13, even though the device of my invention is adjusted to greatly dampen pressure fluctuations, in that the tapered member 16 will be forced away from the tapered seat, thereby substantially increasing the area of the passageway 17.

The markings on the scale 36 may be so calibrated with respect to the markings on the gauge 13, so that for any given pressure in the gauge 13, the tapered member 16 will be properly adjusted with respect to the tapered seat 15 when the readings on said scale and gauge are substantially the same. When the scale 36 is so calibrated with respect to the gauge 13, after the reading on the gauge 13 is obtained, the handle 35 is rotated in order to obtain substantially the same reading on the scale 36 in order to obtain the correct pressure damping for the pressure transmitted to the pressure gauge.

From the foregoing description taken in connection with the accompanying drawing, the uses, advantages, and operation of my invention will be readily understood by those skilled in the art to which the invention appertains. While I have described the form of my invention which I now consider to be the best embodiment thereof, I desire to have it understood that the article shown is merely illustrative and that the invention is not to be limited to the details disclosed herein, but is to be accorded the full scope of the appended claims.

I claim:

1. A device for damping pressure comprising a housing having an inlet opening and an outlet opening, a bore in said housing communicating with said inlet opening and said outlet opening and having a tapered seat, the smaller portion of said tapered seat being adjacent to said outlet opening, a tapered member in said bore, resilient means urging said tapered member toward said tapered seat, and means to adjust the position of said tapered member with respect to said tapered seat in order to vary the area of the passageway between said tapered member and said tapered seat as desired.

2. A device for damping pressure comprising a housing having an inlet opening and an outlet opening, a bore in said housing communicating with said inlet opening and said outlet opening and having a tapered seat, a tapered member in said bore, resilient means urging said tapered member toward said tapered seat and means to adjust the position of said tapered member with respect to said tapered seat in order to vary the area of the passageway between said tapered member and said tapered seat as desired, said tapered member being adapted to be moved away from said tapered seat independently of said adjusting means when the pressure in the outlet opening is substantially greater than the pressure in the inlet opening.

3. A device for damping pressure comprising a housing having an inlet opening and an outlet opening, a bore in said housing communicating with said inlet opening and said outlet opening and having a tapered seat, the smaller portion of said tapered seat being adjacent to said outlet opening, a tapered member in said bore, means to adjust the position of said tapered member with respect to said tapered seat in order to vary the area of the passageway between said tapered member and said tapered seat as desired, said tapered member having a recess, and a spring in said recess adapted to urge said tapered member toward said tapered seat.

4. A device for damping pressure comprising a housing having an inlet opening and an outlet opening, a bore in said housing communicating with said inlet opening and said outlet opening and having a tapered seat, the smaller portion of said tapered seat leading to said outlet opening and a tapered member in said tapered bore, said tapered member being resiliently urged toward said tapered seat.

HOWARD D. GREEN.